United States Patent [19]

Koopman et al.

[11] Patent Number: 4,492,842

[45] Date of Patent: Jan. 8, 1985

[54] PROCESS OF BRAZING USING LOW TEMPERATURE BRAZE ALLOY OF GOLD-INDIUM TIN

[75] Inventors: Nicholas G. Koopman, Hopewell Junction; Vincent C. Marcotte, Lagrangeville, both of N.Y.

[73] Assignee: International Business Machines Corporation, Armonk, N.Y.

[21] Appl. No.: 521,286

[22] Filed: Aug. 8, 1983

[51] Int. Cl.³ .............................................. C22C 5/02
[52] U.S. Cl. ................................ 219/85 M; 420/507; 420/557; 420/555; 228/263.11; 219/85 CM; 219/85 H
[58] Field of Search ............... 420/507, 557, 555; 219/129, 146.22, 85 CA, 85 CM, 85 M, 85 H; 228/263.11, 263.13, 263.18; 148/430

[56] References Cited

U.S. PATENT DOCUMENTS

| 2,464,821 | 3/1949 | Ludwick et al. | 228/209 |
| 2,813,790 | 11/1957 | Hack | 420/512 |

FOREIGN PATENT DOCUMENTS

| 56-84432 | 7/1981 | Japan | 219/85 H |

*Primary Examiner*—L. Dewayne Rutledge
*Assistant Examiner*—Debbie Yee
*Attorney, Agent, or Firm*—Sughrue, Mion, Zinn, Macpeak, and Seas

[57] ABSTRACT

A heat resistant brazing alloy of a major amount of gold, a lesser amount of indium and a minor amount of tin. The alloy is particularly suited for use in bonding electrical components to chip carrying substrates which are to be reworked.

7 Claims, No Drawings

4,492,842

PROCESS OF BRAZING USING LOW TEMPERATURE BRAZE ALLOY OF GOLD-INDIUM TIN

BACKGROUND OF THE INVENTION

This invention relates to the bonding of a first element to a second element by means of soldering or brazing. More particularly, the present invention relates to a brazing or soldering alloy of relatively high melting point.

In general, the term "brazing" is employed with respect to the making of joints with a joining alloy of relatively high melting point while the term "soldering" has come to refer to the making of joints with a joining alloy of lower melting point. At times, the term "soldering" is used in a generic sense to include operations customarily referred to in the art as "brazing".

More particularly, the present invention relates to the bonding of input/output electrical connection pins and other components of a chip carrying substrate in an electronic system. The alloys of this invention are useful in electronic circuit interconnections, such as a chip carrying substrate and its pins, in a manner compatible with the continuous reheating of the chips.

Problems have developed in the use of bonding alloys in the bonding of pins or the like to electronic chip carrying substrates, such as multilayered ceramic substrates, which require reworking, i.e., removal and replacement of chips on the substrate. The bonding alloy used can begin to melt at the high reworking temperatures employed, say as high as 370° C., with resultant movement or tilting of circuit connection pins which places them out of alignment, or causes general weakening of the pin-substrate bond. There is a need in the art for a new brazing or soldering material which remains as a strong joint at the high temperatures used for reworking chip carrying substrates of electronic systems. Thus, there is a need to provide alloys which can bond pins and the like to the substrate, and the substrate to its carrier, with the alloy having a melting point such that the joint comprising the alloy is unaffected by heating the overall structure to a temperature required for melting of the soldered connections retaining chips upon the substrate.

A bonding alloy of eutectic gold and tin in a ratio of 80 parts gold to 20 parts tin, which alloy melts at 280° C., has been used to bond pins to the substrate in an electronic system. However, chip joining can be done at a temperature up to about 360° C. This means that during chip joining or chip replacement, the braze is in the liquid state. Thus, the pins can easily be moved and in addition the liquid metal alloy can also react very rapidly with bonding surfaces, resulting in overall reliability problems. Obviously, braze alloy melting above the chip joining temperature would be more stable and eliminate the reliability problem.

A binary gold-indium alloy, 73 parts gold to 27 parts indium, melts at 456° C. and has been used for brazing; however, because of extreme bittleness, the use of this alloy is limited.

U.S. Pat. No. 2,464,821 by Ludwick et al discloses a binary gold-indium brazing alloy in the proportion of 85 parts gold to 15 parts indium. U.S. Pat. No. 2,813,790 by Hack discloses a ternary brazing alloy of 60 parts gold to 30 parts copper to 5 parts indium.

SUMMARY OF THE INVENTION

An object of the present invenntion is to provide a brazing alloy of high melting point which can be employed to bond input/output electrical connection pins and other components to a chip carrying substrate.

Another object of the present invention is to provide a brazing alloy which retains its integral structure at temperatures employed for attaching or replacement of chips on substrates used in electronic systems.

A more specific object of the present invention is to provide a brazing alloy which is unaffected by heating of an electronic substrate to a temperature sufficient to melt the solder connections which retain chips upon the substrate.

A more specific object of the present invention is to provide a brazing alloy having a melting temperature of the order of that of a gold/indium alloy, but not characterized by the brittleness of a gold/indium alloy.

In accordance with the present invention, there is provided a brazing alloy consisting essentially of gold, indium and tin. More specifically, the brazing alloy of the present invention contains at least 5% tin and over 60% gold, with the remainder being essentially indium.

Another embodiment of the present invention relates to bonding together a first surface to a second surface by means of the above disclosed gold-indium-tin brazing alloy. A more specific embodiment of the present invention relates to the bonding of input/output electrical connection pins and other components of a chip carrying substrate to the substrate or a surface layer thereon utilizing the above disclosed gold-indium-tin brazing alloy.

DETAILED DESCRIPTION OF THE INVENTION

The present invention overcomes problems related to the brazing of pins to a chip carrying substrate or the brazing of the substrate to a flange used to support the substrate carrying the chips. In the prior art, problems have developed with respect to the joints in the above described areas of electronic packages due to the need for carrying out additional brazing operations on the electronic system at a later time which results in the application of temperatures high enough to adversely affect the braze used to join the pins to the substrate and the braze used to join the substrate to the flange.

In accordance with the present invention, a braze is provided for electronic packaging of components which provides brazed joints which exhibit melting temperatures that are substantially higher than the temperatures at which subsequent manufacturing operations need occur. In this manner, the brazed joint of the present invention does not undergo even partial melting at temperatures of the order of 360° C., which are often used in chip joining and reworking operations. For example, a gold-tin alloy containing 20 weight percent tin has been used in the brazing of nickel plated multilayered ceramic structures at 400° C. This alloy begins to melt at about 280° C., which is lower than the temperature of 360° C. used in chip joining operations. This leads to a number of undesirable effects, included among which are:

1. Relative motion between the members that were joined.

2. Diffusion of tin from the brazed joint to the nickel plated surfaces to form nickel-tin intermetallics, thus depleting the surfaces of unreacted nickel which is essential for good adhesion.

3. Collapse and distortion of the gold-tin fillet due to out-diffusion of tin and due to run-out of the liquid phase of the braze alloy at 360° C., with its attendant loss of strength and side support in the use of input/output pins.

In accordance with the present invention, a ternary braze alloy of gold-indium-tin is utilized in the formation of joints within the electronic package where subsequent high temperature procedures are to be carried out.

The ternary braze alloy of the present invention consists essentially of a major amount of gold (at least 60% by weight, preferably 70% by weight), a minor amount of tin (from about 5 to 10% by weight, preferably 10% by weight), with the remainder consisting essentially of indium. The gold can be present in an amount up to about 80% by weight. The indium is present in an amount of about 15 to 30% by weight.

The following table sets forth the melting temperature parameters of a number of alloys of the present invention, in comparison with alloys of gold-indium, which have high melting points, but are extremely brittle.

| Alloy | | | Temperature (°C.) | |
|---|---|---|---|---|
| Au | In | Sn | Solidus | Liquidus |
| 80 | 20 | 0 | 470 | <492 |
| 75 | 25 | 0 | 447 | <457 |
| 70 | 30 | 0 | 447 | <463 |
| 80 | 15 | 5 | 370 | 465 |
| 75 | 20 | 5 | 370 | 415 |
| 70 | 25 | 5 | 370 | 465 |
| 65 | 30 | 5 | 415 | 502 |
| 70 | 20 | 10 | 370 | 446 |
| 65 | 25 | 10 | 370 | 499 |
| 60 | 30 | 10 | 417 | 505 |

EXAMPLE

Four of the above alloys were used to join nickel-gold plated Kovar® pins to a multi-layered ceramic substrate at 510° C. in a forming gas atmosphere of 10% H$_2$-90% N$_2$. Ten pins were joined to the substrate. Five pins were pulled using a standard 20° offset pull test (substrate is positioned at a 20° incline to horizontal and the pins are pulled in the direction normal to horizontal).

The pull strength, failure mode and solidus and liquidus temperatures are given in the table below:

| Alloy | | | Temperature (°C.) | | Pull | Failure Mode | |
|---|---|---|---|---|---|---|---|
| Au | In | Sn | Solidus | Liquidus | Strength | Shank | Ceramic |
| 70 | 20 | 10 | 370 | 446 | 21.0 ± 0.4 | 5/5 | — |
| 75 | 20 | 5 | 370 | 415 | 13.6 ± 5.7 | 2/5 | 3/5 |
| 65 | 25 | 10 | 370 | 500 | 10.1 ± 7.3 | 1/5 | 4/5 |
| 75 | 20 | 5* | 370 | 410 | 5.1 ± 3.8 | — | 3/3 |

*Brazed at 415° C. max. temperature - all other conditions the same.

From the above example, it is seen that the alloy of 70 weight percent gold, 20 weight percent indium and 10 weight percent tin exhibited the best results under the test conditions. Metallography was also performed on the joints from the 70Au 20In 10Sn alloy which showed that braze reaction with the nickel of the substrate was not excessive, that is most of the nickel plating on the substrate was unreacted.

The alloys of the present invention can be prepared by placing the appropriate amounts of each of the elements of appropriate purity in a heating vessel, heating to a temperature at which all the material in the vessel is liquid, being certain that a homogeneous mixture of the liquid results, and then cooling to form the alloy. Thereafter, the solid alloy can be comminuted into sizes suitable for working or the molten alloy can be molded into suitable shapes, such as small diameter rods and the like.

Variations of the invention will be apparent to the skilled artisan.

We claim:

1. In a process for joining chips to a nickel-plated circuit on the surface of a multi-layer ceramic structure at a temperature of about 300° to 360° C. wherein brazed joints are provided prior to said joining, the improvement which comprises forming said braze joints with a brazing alloy consisting essentially of gold, indium and tin, said brazing alloy not undergoing even partial melting at a temperature below about 360° C.

2. The process of claim 1 wherein in the brazing alloy the gold is present in an amount of at least about 60 weight %, the indium is present in an amount of about 15 to 30% by weight and the tin is present in an amount of at least 5% by weight, the total for the three elements being 100% by weight.

3. The process of claim 1 wherein the brazing alloy contains about 60 to 80% gold, about 15 to 30% indium, and about 5 to 10% tin.

4. The process of claim 1 wherein said alloy consists essentially, by weight, of 70% gold, 20% indium and 10% tin.

5. The process of claim 1 wherein the brazing alloy has a solidus temperature of at least 370° C.

6. The process of claim 1 wherein the brazing alloy has a solidus temperature of at least 410° C.

7. The process of claim 1 wherein said brazed joints are for bonding input/output electrical connection pins.

* * * * *